(12) United States Patent
Poole et al.

(10) Patent No.: US 8,641,420 B2
(45) Date of Patent: Feb. 4, 2014

(54) ENHANCEMENT OF LIVE AND SIMULATED PARTICIPANT INTERACTION IN SIMULATORS

(75) Inventors: Chandria A. Poole, Orlando, FL (US); Jonathan C. Brant, Orlando, FL (US); Omar Hemmali, Orlando, FL (US); Michael Riera, Hialeah, FL (US)

(73) Assignee: Lockheed Martin Corporation, Orlando, FL (US)

( * ) Notice: Subject to any disclaimer, the term of this patent is extended or adjusted under 35 U.S.C. 154(b) by 417 days.

(21) Appl. No.: 12/902,991

(22) Filed: Oct. 12, 2010

(65) Prior Publication Data

US 2012/0088209 A1   Apr. 12, 2012

(51) Int. Cl.
*F41A 33/00* (2006.01)

(52) U.S. Cl.
USPC .............................................................. 434/11

(58) Field of Classification Search
USPC ............................. 434/236, 322–365, 11–71; 345/473–475; 379/265.02; 715/757
See application file for complete search history.

(56) References Cited

U.S. PATENT DOCUMENTS

| | | | |
|---|---|---|---|
| 6,080,063 A | 6/2000 | Khosla | |
| 6,404,438 B1 * | 6/2002 | Hatlelid et al. | 345/473 |
| 6,483,511 B1 | 11/2002 | Snyder | |
| 2002/0138286 A1 * | 9/2002 | Engstrom | 705/1 |
| 2003/0193504 A1 * | 10/2003 | Cook et al. | 345/473 |
| 2005/0095569 A1 | 5/2005 | Franklin | |
| 2005/0137015 A1 | 6/2005 | Rogers et al. | |
| 2006/0073449 A1 * | 4/2006 | Kumar et al. | 434/219 |
| 2006/0128460 A1 | 6/2006 | Muir et al. | |
| 2007/0293289 A1 | 12/2007 | Loeb | |
| 2008/0027692 A1 | 1/2008 | Fables et al. | |
| 2008/0162261 A1 | 7/2008 | Velazquez et al. | |
| 2009/0099836 A1 | 4/2009 | Jacobsen et al. | |
| 2009/0248420 A1 | 10/2009 | Basir et al. | |

FOREIGN PATENT DOCUMENTS

GB   2365360 A   2/2002

* cited by examiner

*Primary Examiner* — Timothy A Musselman
(74) *Attorney, Agent, or Firm* — Withrow & Terranova, PLLC

(57) ABSTRACT

A simulated participant system is configured to interoperate with existing simulators to create an integrated simulation platform with enhanced capabilities to provide, on a readily-scalable basis, simulated participants of one or more different types that are based on dynamically constructed virtual models of live simulation participants. The system observes live participants as they train with a simulator using a closed-loop, self-training configuration by continuously monitoring conversations and actions to create and maintain the virtual models on-the-fly. The virtual models may then be utilized to generate simulated participants to stand in for the live participants when they are absent from future simulator training sessions. Because a simulated participant was virtually modeled from observations of a live participant, the simulated behaviors, as expressed by actions and responses, can typically closely match the expected behavior of the absent live participant.

18 Claims, 10 Drawing Sheets

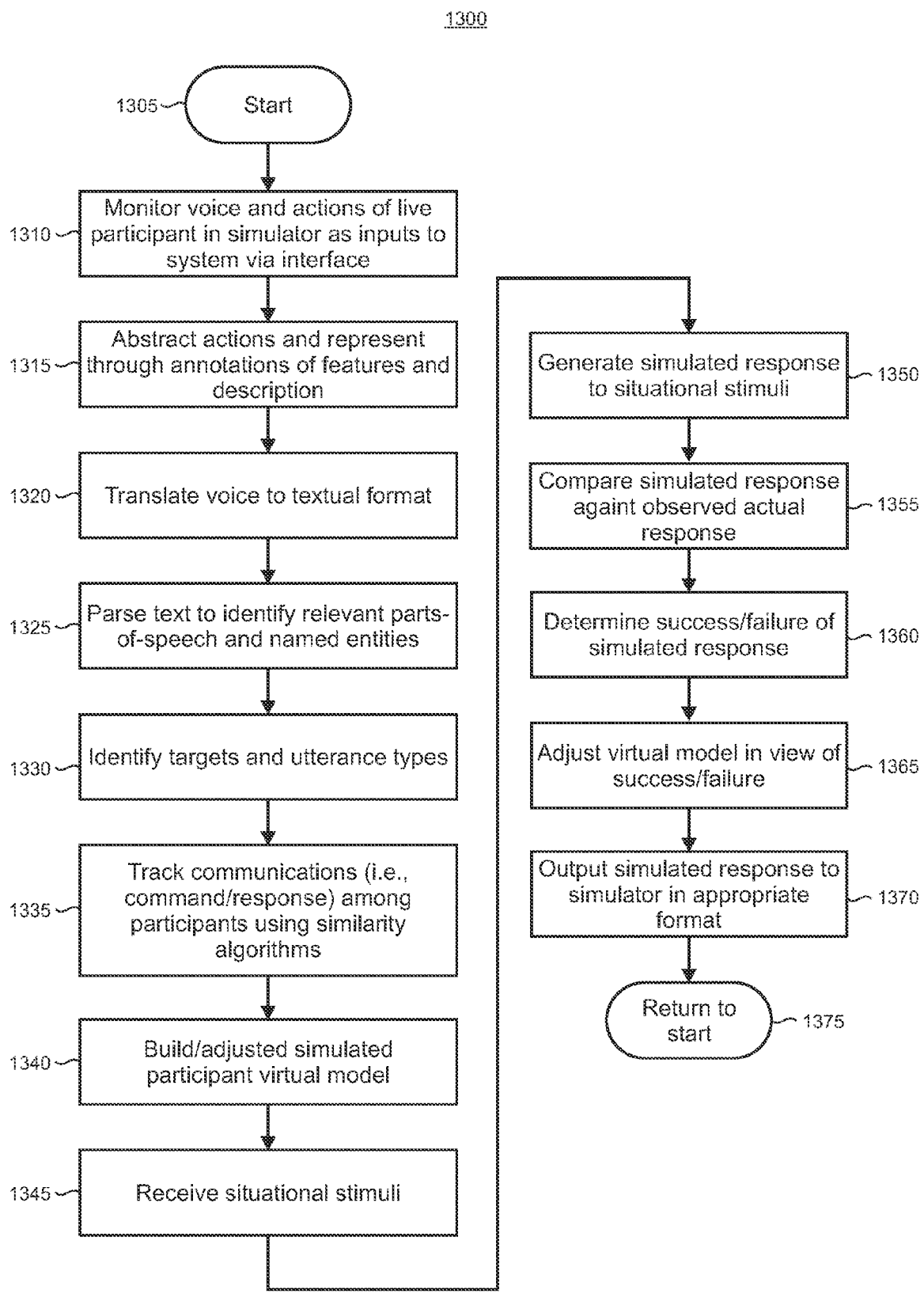

ENHANCEMENT OF LIVE AND SIMULATED PARTICIPANT INTERACTION IN SIMULATORS

BACKGROUND

Increased capabilities in computer processing, such as improved real-time image and audio processing, have aided the development of powerful training simulators such as vehicle, weapon, and flight simulators, action games, and engineering workstations, among other simulator types. Simulators are frequently used as training devices which permit a participant to interact with a realistic simulated environment without the necessity of actually going out into the field to train in a real environment. For example, different simulators may enable a live participant, such as a police officer, pilot, or tank gunner, to acquire, maintain, and improve skills while minimizing costs, and in some cases the risks and dangers, that are often associated with live training.

While current simulators perform satisfactorily in many applications, customers for simulators such as branches of the military, law enforcement agencies, industrial and commercial entities, etc., have expressed a desire for flexible, scalable, and cost effective simulators that allow for the easy expansion of the number and types of simulated participants with whom live participants may interact. Customers have also demonstrated a desire to obtain enhanced simulation functionality but without the need to purchase new simulators or simulator hardware, or having to extensively reconfigure an existing simulator. In addition, simulator customers typically seek to improve the quality of the simulated training environments supported by simulators by increasing realism in simulations and finding ways to make the simulated experiences more immersive.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

A simulated participant system is configured to interoperate with existing simulators to create an integrated simulation platform with enhanced capabilities to provide, on a readily-scalable basis, simulated participants of one or more different types that are based on dynamically constructed virtual models of live simulation participants. The system observes live participants as they train with a simulator using a closed-loop, self-training configuration by continuously monitoring conversations and actions to create and maintain the virtual models on-the-fly. The virtual models may then be utilized to generate simulated participants to stand in for the live participants when they are absent from future simulator training sessions. Because a simulated participant was virtually modeled from observations of a live participant, the simulated behaviors, as expressed by actions and responses, can typically closely match the expected behavior of the absent live participant. The simulated participants thus interact with live participants and respond to other stimuli in the environment as would their live counterparts which adds realism to the simulation, and which can increase training effectiveness by broadening the scope of a live participant's interaction with the simulator when it is interoperated with the present system.

Through interoperation with multiple single-purpose simulators (for example, an airborne simulator, vehicle simulator, ground combat simulator) on a cross-platform basis, the simulated participant system can observe different types of live participants to subsequently generate different types of simulated participants such as pilot, vehicle driver, and combat soldier types. Same type and/or different types of simulated participants can then be inserted into a simulation supported by an otherwise single-purpose simulator to transparently increase its capabilities. Thus, for example, a live participant in a ground combat simulation can interact with a simulated participant that realistically stands-in for a squad member who is absent from the training simulation. And, the live participant may converse over the radio with a simulated pilot (who is modeled after a live pilot based on observations made by the system when interoperating with the airborne simulator) to call in air support. Likewise, the live participant may interact with a simulated driver (who is modeled after a live driver based on observations made by the system when interoperating with the vehicle simulator) to set up a supply line to the squad.

The present system can further provide simulated participants on a scalable basis to the simulator. That is, the present system can provide simulated participants of varying types and in varying numbers as may be required to meet the needs of a given simulation scenario. So for example, the simulated participant system could provide stand-ins for the entire squad of combat soldier if they are all absent from a training simulation. Similarly, a live participant might interact with pilots of an entire squadron of aircraft, and/or drivers from an entire convoy of vehicles. The present system solution readily scales up or down while maintaining a high degree of realism because the simulated participants supplied to the simulator are directly modeled on their live counterparts.

In various illustrative examples, the simulated participant system is implemented substantially in software using a modular approach and is configured to interoperate with existing simulators using standard or proprietary communication protocols on a plug and play basis. Exemplary functional modules include a natural language processing module, a profiler module, an expert system module, a natural language generation module, an actions/conversation monitor module, and a system database. The natural language processing module is arranged for parsing monitored conversations to identify natural language expression which are correlated by the expert system with commands, questions, responses, and other utterances made by the live participants over the course of a simulation to generate the virtual models.

Advantageously, the simulated participant system enables simulator customers to significantly increase the core capabilities and functionalities of its existing and legacy simulators in a transparent manner and without the need for time-consuming and potentially expensive simulator hardware configuration modifications. The simulated participants can be scaled up or scaled down as needed to meet the particular requirements of a simulated training scenario while increasing simulation realism for the live simulator participants. The cross-platform modeling capabilities of the present system further enhance training effectiveness by increasing a live participant's scope of interaction with the simulation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 13 is a flow chart of an illustrative method of operating the simulated participant system.

Like reference numerals indicate like elements in the drawings. Unless otherwise indicated, elements are not drawn to scale.

DETAILED DESCRIPTION

Figure 1:
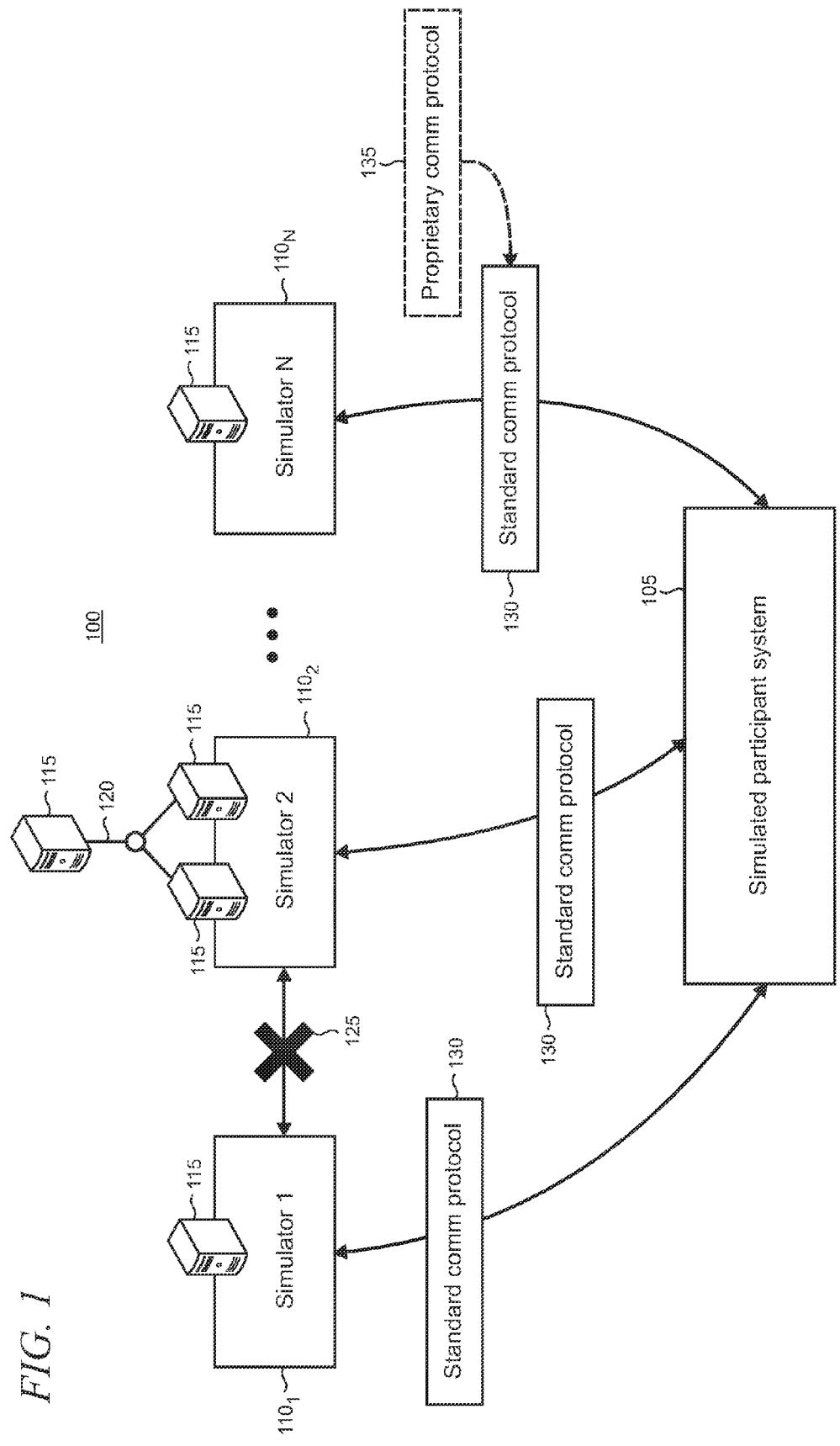
FIG. 1 shows an illustrative environment in which the present simulated participant system may be implemented.

FIG. 1 shows an illustrative environment 100 in which the present simulated participant system 105 may be implemented. The simulated participant system 105 may typically be configured to interoperate with one or more conventional simulators $110_{1, 2 \ldots N}$ which can provide any of a variety of simulated or "virtual" environments that are frequently used for training, education, or entertainment purposes, among other typical uses. Simulators 110 may provide a graphical or visual display that can be supplemented with various structures to implement control and other interfaces with live human participants who are using the simulator. Thus, for example, simulator 1 ($110_1$) might implement a driving simulation that employs a steering wheel, brake, accelerator, and a graphically displayed virtual driving environment with which the participant interacts, while simulator 2 ($110_2$) might implement a flight simulator with a stick, rudder pedal, and/or other flight controls along with an avionics display, and so forth.

The simulators 110 will typically operate on general-purpose or application-specific computing devices, or a mix of devices. In some cases, a simulator will utilize one or more local computers 115, as shown with simulators 1 and N in FIG. 2 (respectively indicated by reference numerals $110_1$ and $110_N$). In other cases, simulators 110 may operate across multiple distributed computers 115 over a network 120, as shown with simulator 2 ($110_2$). Although a given simulator 110 may operate over networked distributed computing infrastructure, interoperation and data-exchange between disparate simulators is rarely implemented, as indicated by reference numeral 125. That is, simulators tend to be pre-configured for a single-purpose and operated in isolation so that a driving simulator only supports a driving experience; a shooting simulator only supports a shooting experience, etc. Changes to the pre-configured core simulator capabilities can typically be expected to be time-consuming and relatively expensive to implement.

As shown in FIG. 1, the simulated participant system 105 may interoperate with the simulators 110 using a standard communication protocol 130. For example, the standard communication protocol may be DIS (Distributed Interactive Simulation) or HLA (High Level Architecture), or other known protocols. However, in other implementations, a proprietary (i.e., non-open) communication protocol 135 may be alternatively or optionally utilized (as indicated by the dashed lines in FIG. 1) to implement communication and interoperability between the simulated participant system 105 and a simulator 110 as may be required to meet the needs of a particular application of the present simulated participant system.

Figure 2:
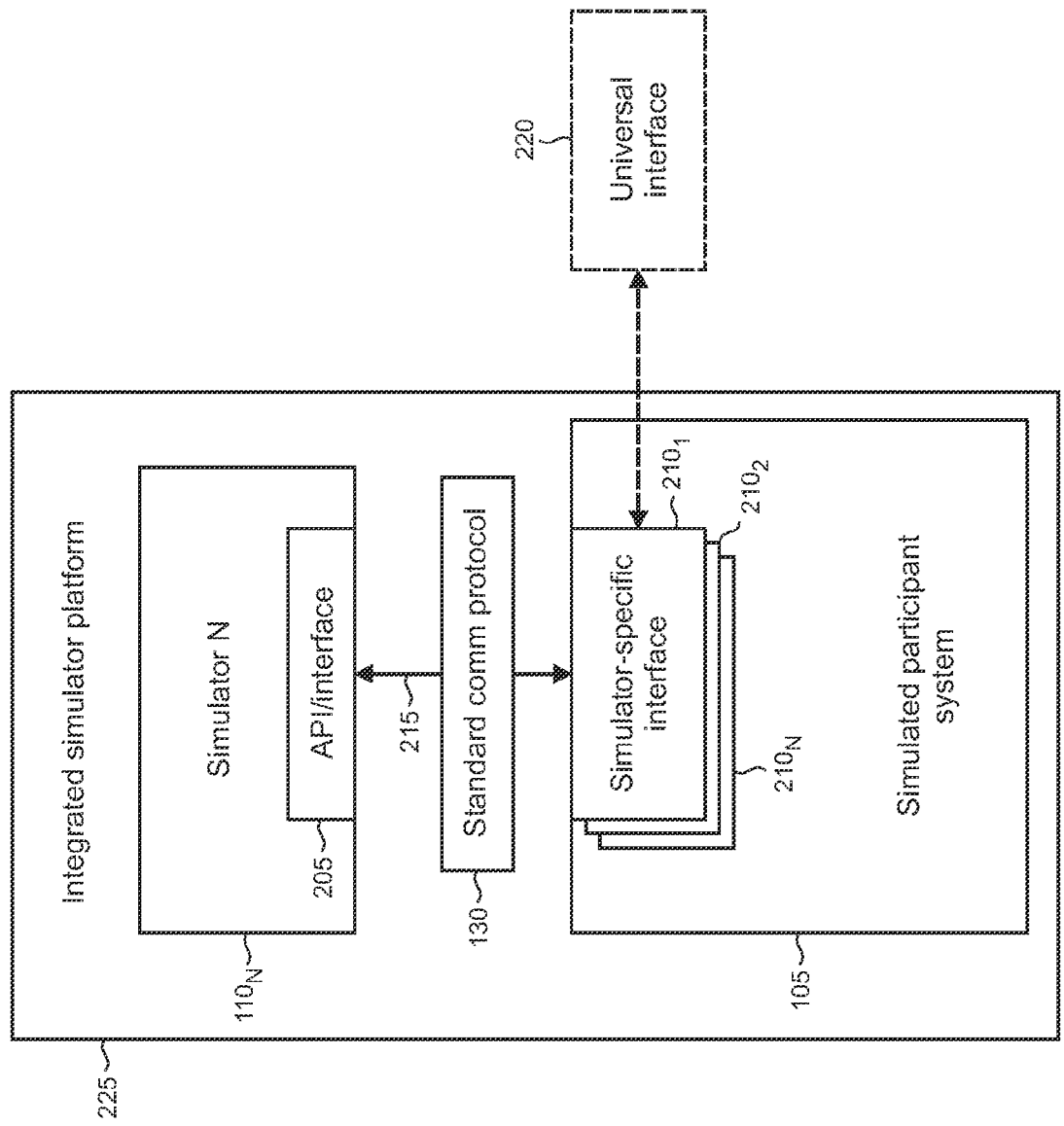
FIG. 2 highlights implementation details that support the interoperability between the simulated participant system and a simulator.

FIG. 2 highlights implementation details that support the interoperability between the simulated participant system 105 and a simulator 110. Typically, the simulator 110 can expose an application programming interface ("API") 205 or some other interface to external applications/systems through which calls, data, functions, methods, and other communications may be bilaterally passed and processed over the protocol 130. The simulated participant system 105 will typically implement a counterpart, analogous interface 210 to the API 205 to effectuate a bilateral communication path 215 between the system 105 and simulator 110. In some applications of the simulated participant system 110, the interface 210 can be implemented using one or more simulator-specific interfaces 210 so that specific functionalities can be implemented for specific simulators 110. Alternatively, a generic or universal interface 220 may replace the simulator-specific interface 210 (as indicated by the dashed lines in FIG. 2) and be utilized across a multiplicity of simulators. In some implementations, the simulated participant system 105 can be equipped with both simulator-specific and universal interfaces (reference numerals 210 and 220, respectively).

As shown in FIG. 2, the combination of the simulator 110 and system 105 essentially function as an integrated simulator platform 225. That is, the simulated participant system 105 enables enhanced functionality to be readily added to the native functionality of simulator 110. Such enhanced functionality may be implemented in a seamless and transparent manner so that the capabilities of the simulator 110 can be expanded, for example, to cover additional usage scenarios, provide a more feature-rich and/or diverse user experience, or extend the useful life of an existing simulator. In many applications, the simulated participant system 105 is configured and operates substantially as a cost-effective software plug-in to existing simulators to implement the integrated platform 225 on a plug-and-play basis. In other applications, the simulated participant system 105 may be implemented using a combination of software and hardware, or hardware alone in some cases.

Figure 3:
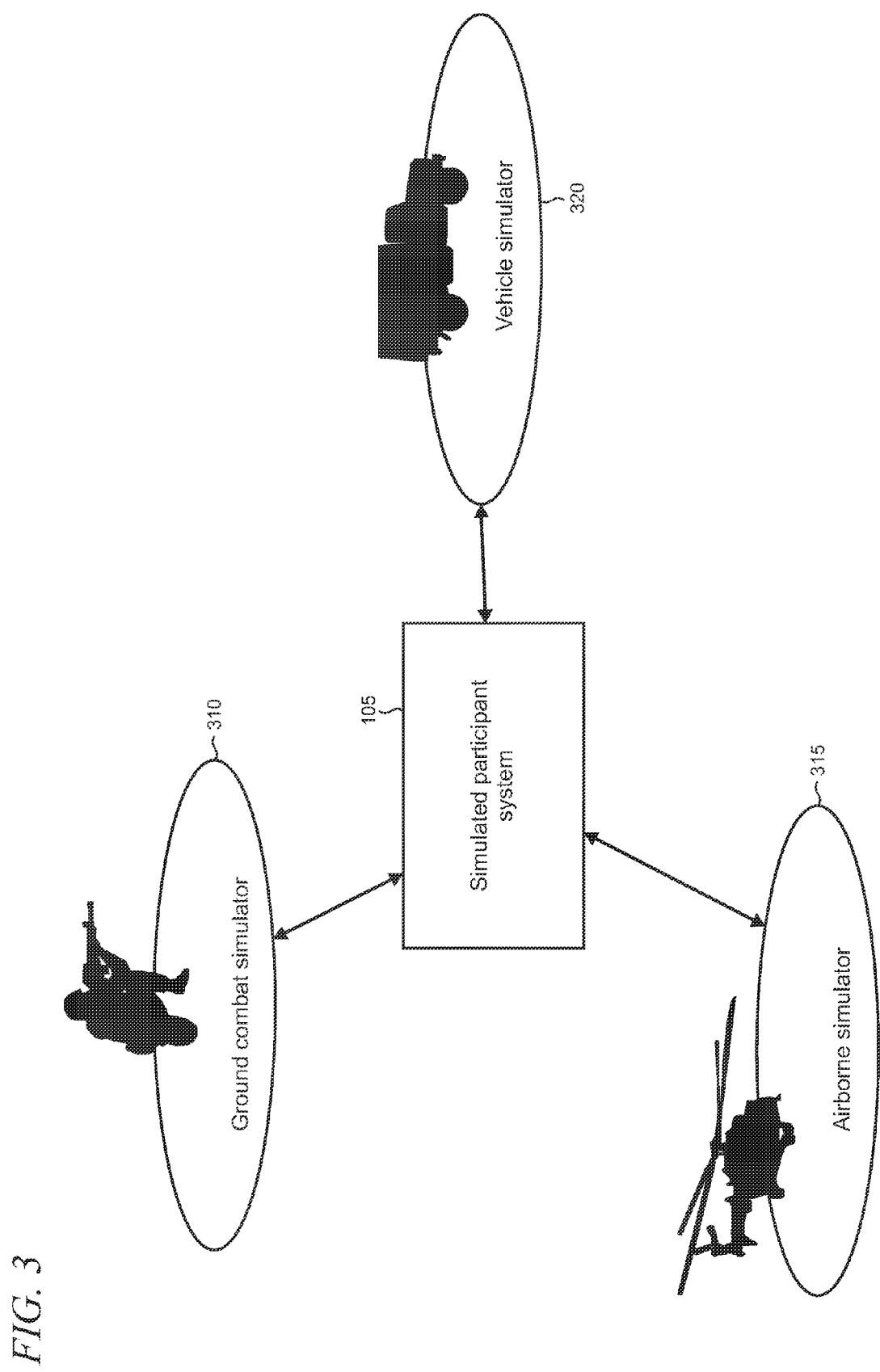
FIG. 3 shows illustrative interoperability of a simulated participant system with multiple diverse simulators.

This integrated approach in providing enhanced functionality enables a flexible, cost-effective, and scalable solution for both current and legacy simulators. More specifically, the present simulated participant system 105 may be arranged to be integrated and interoperate across diverse simulators. For example, as shown in FIG. 3, the simulated participant system interoperates with three different military-type simulators including a ground combat simulator 310, an airborne simulator 315, and a vehicle simulator 320. It is emphasized that these particular simulators are intended to be illustrative and that other types and kinds of simulators in other areas (e.g., industrial, emergency response/911, law enforcement, air traffic control, firefighting, education, sports, commercial, engineering, medicine, gaming/entertainment, etc.) could also be utilized depending on the requirements of a particular usage scenario.

When configured to operate on a cross-platform basis, the simulated participant system 105 can be utilized to provide simulated participants of uniform or different types to a given simulator. Such cross-platform simulation can typically be expected to give the live participants who use the simulator a richer, more immersive, and more realistic experience.

Figure 4:
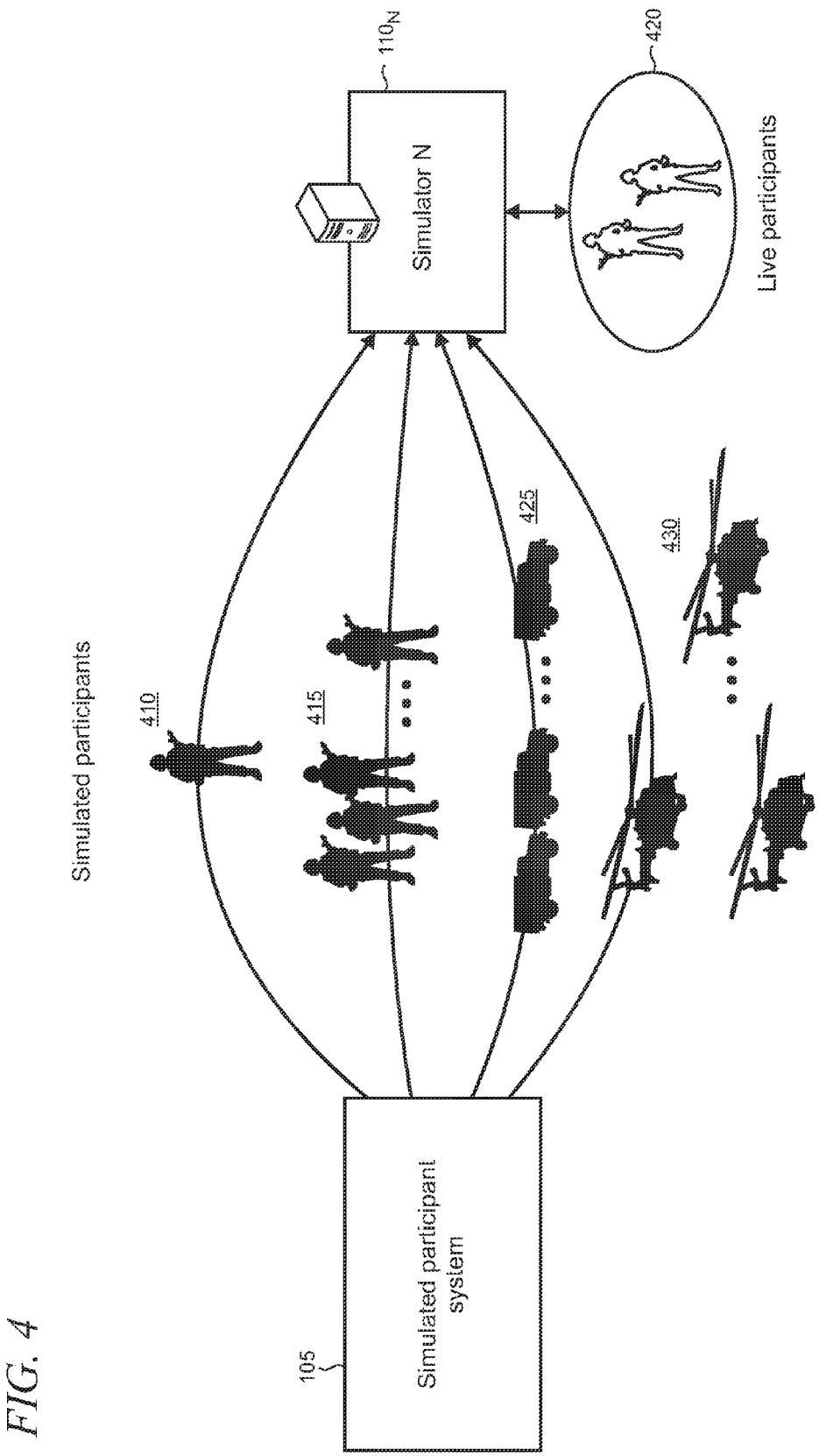
FIG. 4 shows the scalability of provision of simulated personnel of varying types to a simulator.

Such a flexible and scalable capability is highlighted in FIG. 4, where the simulated participant system 105 is shown as providing a varying number and different types of simulated participants to the simulator $110_N$. As shown, a single simulated participant 410—which in this illustrative example is a simulated participant generated through interoperation with the ground combat simulator 310 (FIG. 3)—can be supplied to the simulator $110_N$. Alternatively, the number of simulated ground combat participants can be scaled up from 2 ... N, as indicated by reference numeral 415, so that, for example, a complete squad, platoon, company, etc., of simulated ground combat participants could be provided to the simulator $110_N$ to interact with one or more live participants 420 who are using the simulator $110_N$.

Similarly, one or more simulated drivers generated by the simulated participant system 105 through interoperation with the vehicle simulator, as indicated by reference numeral 425 in FIG. 4, could also be provided to the simulator $110_N$. Thus, for example, the live participants 420 could gain the training benefit of conversing with a simulated driver over a radio link, or calling in an entire convoy of vehicles to support a given simulated mission. Simulated pilots, which are generated by the simulated participant system 105 through interoperation with the airborne simulator 315 (FIG. 3), could also be provided to the simulator $110_N$, as indicated by reference numeral 430, to support interactions between the live participants 420 and a single simulated pilot, for example, or an entire squadron of pilots as the needs of a particular simulated training scenario demand. In all of the above examples, the simulated participant system 105 enables a rapid, easy-to-implement, and readily-scalable solution to be deployed at the simulator $110_N$. In addition, the support for multiple participant types enabled by the cross-platform simulation feature described above can further broaden the scope of training and add realism to even relatively narrowly-purposed simulators.

Figure 5:
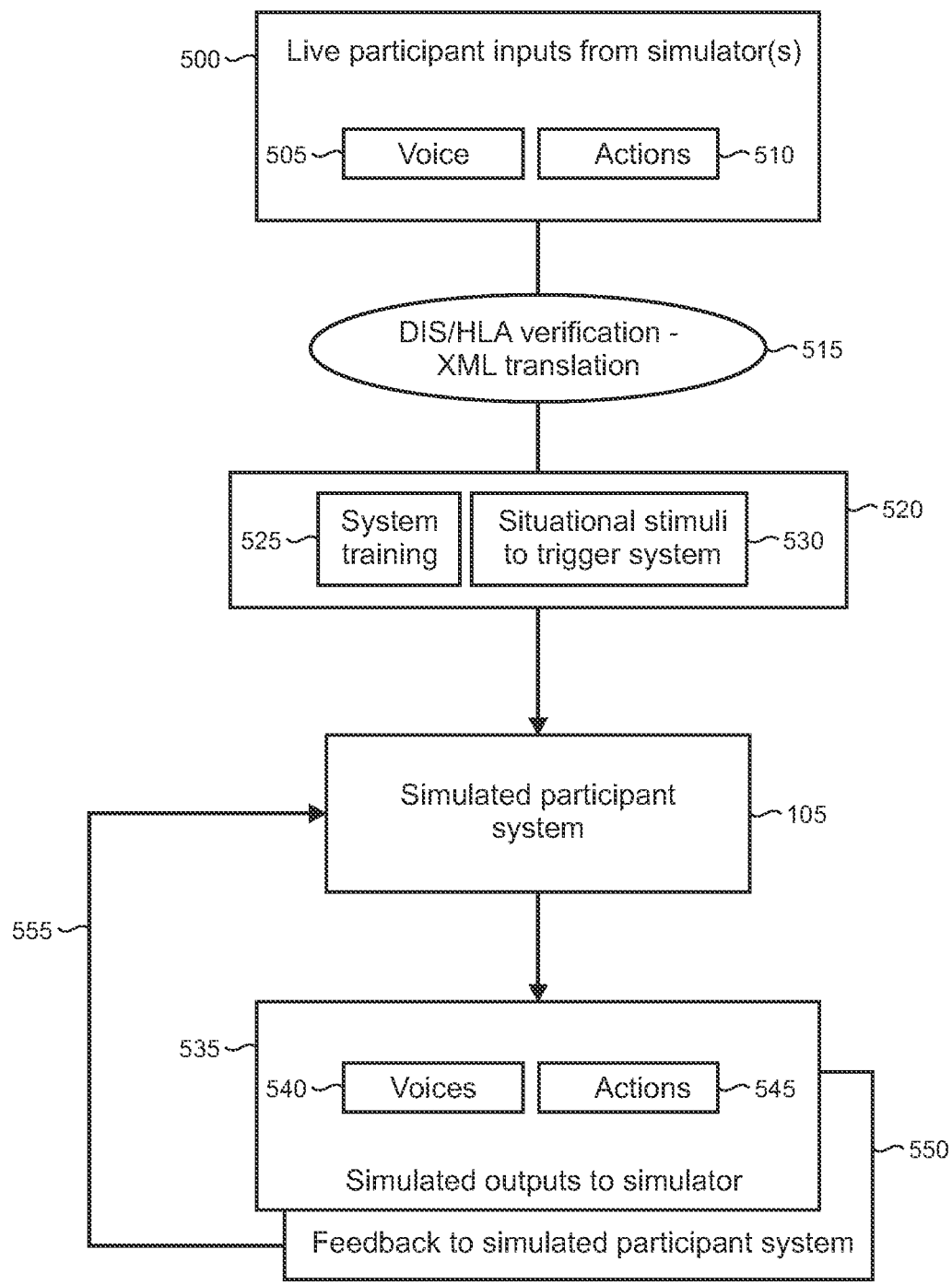
FIG. 5 shows an overview of the input and output to and from the simulated participant system.

FIG. 5 shows an overview of the inputs and outputs to and from the simulated participant system 105. The inputs 500 typically comprise data that is indicative of voice 505 and actions 510 of live participants and/or instructors as they train on a given simulator which is received over the communication path 215 (FIG. 2). In cross-platform applications, input 500 can be received from multiple simulators. The input 500, which can typically be in the form of data packets which conform with the DIS or HLA protocol, for example, may be verified for integrity and translated into a textual format such as XML (eXtensible Markup Language) by the simulated participant system 105 prior to subsequent processing as indicated by reference numeral 515.

The input 500 is utilized for parallel purposes, as indicated by reference numeral 520 in FIG. 5, including functioning as an input to train the system 105 as it generates and maintains simulated participants (reference numeral 525), as well as functioning as situational stimuli to trigger the system 105 to provide appropriate responses and actions from the simulated participants as a simulation unfolds (reference numeral 530).

Thus, the voice and actions of a live participant (named "Sergeant Jones" in this illustrative example) can be monitored by the simulated participant system 105 as he engages in a ground combat simulation supported by simulator 310 (FIG. 3). Such monitoring enables the system 105 to generate a virtual model for a virtual Sergeant Jones which can then be subsequently utilized as a simulated participant in the ground combat simulator 310 when the live Sergeant Jones is not participating, or as a simulated participant in another simulator on a cross-platform basis. Typically, a generic virtual model can be initially utilized which can then be augmented and/or refined, iteratively in some cases, using the data observed and collected during the monitoring. The monitoring can be performed continuously in a closed loop manner as Sergeant Jones interacts with the simulation so that the simulated participant system 105 can constantly train itself to generate, maintain, and update the virtual model of Sergeant Jones to be as accurate as possible.

The input further functions as stimuli to the simulated participant system 105 to invoke actions and responses from those simulated participants supported by the system in a given simulation. For example, assume live Sergeant Jones is absent from participating in a training simulation run on the ground combat simulator 310 (FIG. 3) while the rest of his squad is available to participate in the training The simulated participant system 105 can then provide a virtual Sergeant Jones as a simulated participant to the ground combat simulator 310. During the training simulation, a question from a live soldier in Sergeant Jones' squad will be used to invoke a response (e.g., a verbal response such as a command or an action) from the virtual Sergeant Jones. The response is generated by the simulated participant system 105 and based on a virtual model created and maintained by observing live Sergeant Jones during prior simulations. As a result, the response from virtual Sergeant Jones would appear to the live soldier be the same response that he or she would expect to come from the live Sergeant Jones.

As indicated by reference numeral 535, the output from the simulated participant system 105 includes simulated voices 540 and actions 545. The output 535 can be provided to a simulator as a response to a situational stimulus for example. In addition, the output can be utilized as feedback 550 through a feedback loop 555 to the simulated participant system 105 as part of its constant training capability. In this regard, for example, when live Sergeant Jones participates in a subsequent training simulation, his actual characteristics and behavior (as expressed by voice responses and actions) can be compared against his virtual model and the similarities and/or differences between the actual and modeled behavior may be used to update the model.

Figure 6:
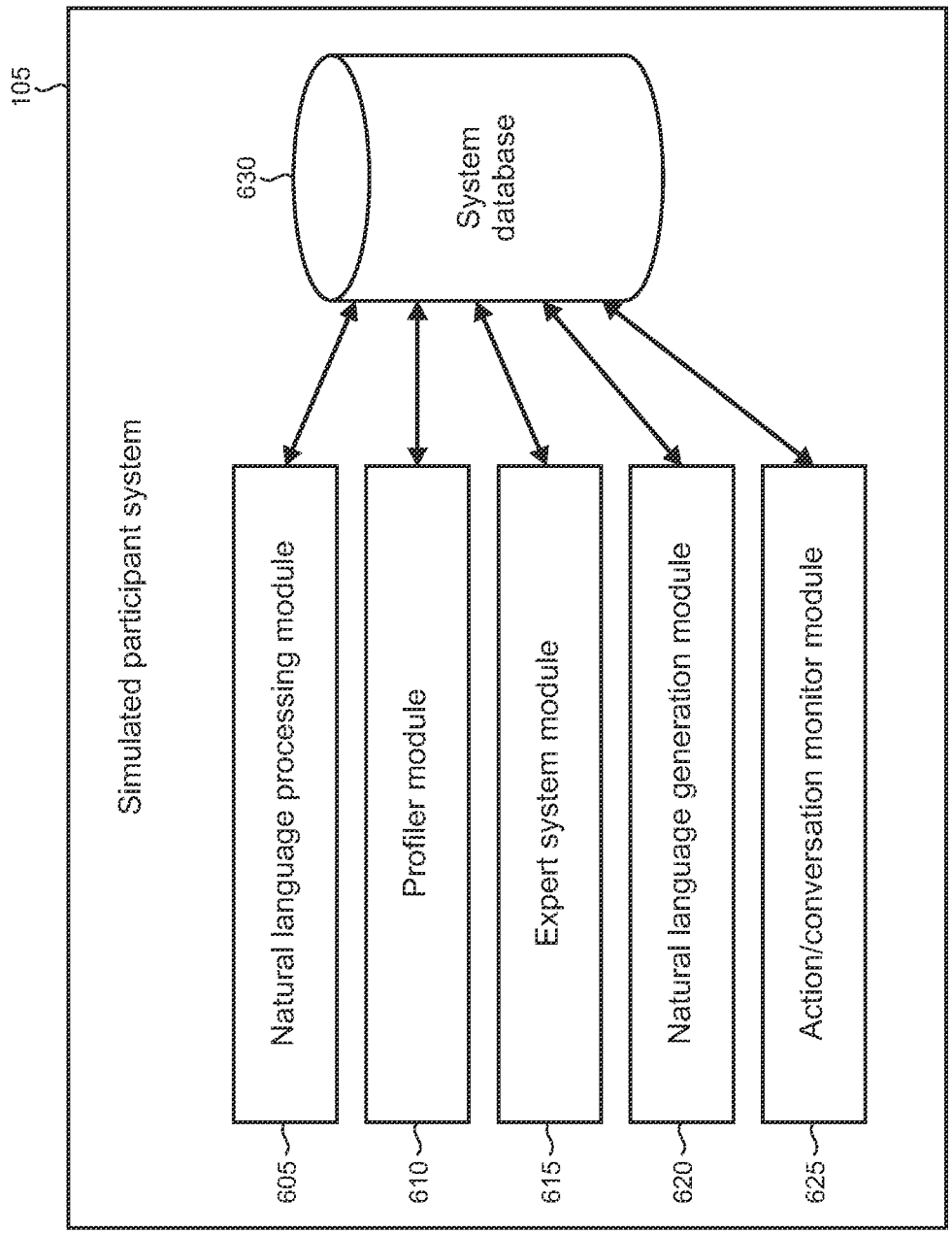
FIG. 6 is a simplified functional block diagram that shows illustrative components of the simulated participant system.

FIG. 6 is a simplified functional block diagram that shows illustrative components of the simulated participant system 105. The system 105 includes a natural language processing module 605, a profiler module 610, an expert system module 615, a natural language generation module 620, and an action and conversation monitor (i.e., listener) module 625. Each of these modules is operatively coupled to a system database 630.

Figure 7:
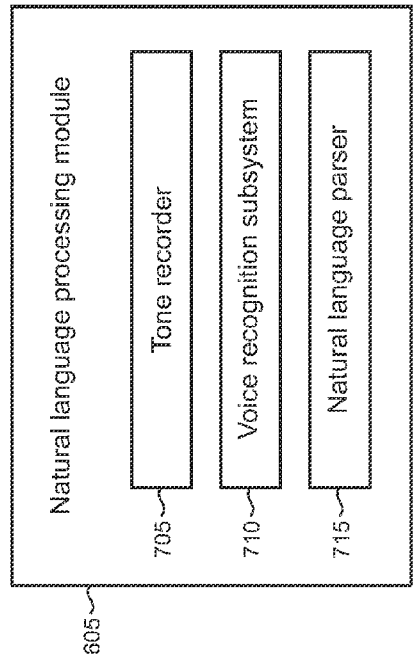
FIG. 7 shows illustrative details of a natural language processing module supported by the simulated participant system.

FIG. 7 shows illustrative details of the natural language processing module 605. Upon detection of a voice, a tone recorder 705 extracts tone features from the input 500 (FIG. 5) in order to determine priority and urgency of the detected expressions. Such tone features can subsequently be utilized in combination with other data and processing to determine if the detected expression is a command, question, response, or other utterance. A voice recognition subsystem 710 is utilized to perform the voice translation to textual format discussed above. A natural language parser 715, such as one implemented using the known Stanford or Charniak parsers, operates to identify grammatical structures of the text to disambiguate the text into particular parts of speech and to recognize and identify named entities (i.e., entities of a particular type such as persons who train with a given simulator) which are stored in the simulated participant system 105, as discussed below.

Figure 8:
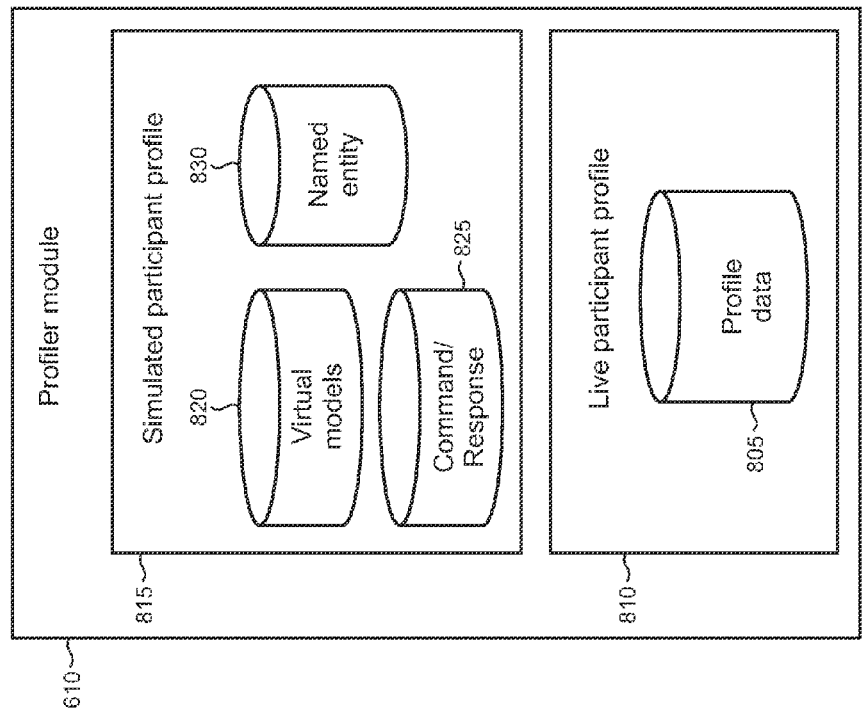
FIG. 8 shows illustrative details of a profiler module supported by the simulated participant system.

FIG. 8 shows illustrative details of the profiler module 610 which includes profiles for both live and simulated participants. Profile data 805 that is used to define a live participant profile 810 which may typically be utilized to identify who a given live participant is, and what role that participant takes in a given simulation. For example, the live participant profile 810 may identify the functional roles of live participants, the rank structures or hierarchical relationships among live participants, and the like. Such profile data may be utilized by the simulated participant system 105 to identify target words or phrases in the detected speech and differentiate among the utterance types (i.e. questions, commands, responses, etc.). For example, if the profile data indicates that a live player holds rank or is a senior/veteran soldier, such status can be considered during the target word/phrase identification (i.e., rank and seniority of a participant may indicate increased likelihood that utterances are commands).

A simulated participant profile 815 is also supported in the module 610 which may be implemented using a cognitive model in conjunction with a virtual model store 820, a command/response store 825, and a named entity store 830 for storing the recognized and identified named entities. The conversations and actions of live participants when interacting with a simulator are continuously monitored on-the-fly using the action/conversation monitors 625 so that action patterns may be observed, modeled, and stored in store 820 on an individual per-participant basis (i.e., on an identified named entity basis). Typically, the modeling includes abstracting the actions and generating action representations using descriptions and annotations of key features. Similarly, conversations occurring during a simulation, including commands and responses of live participants, are monitored, tracked, and stored on a per-participant basis in the virtual model store 820.

Figure 9:
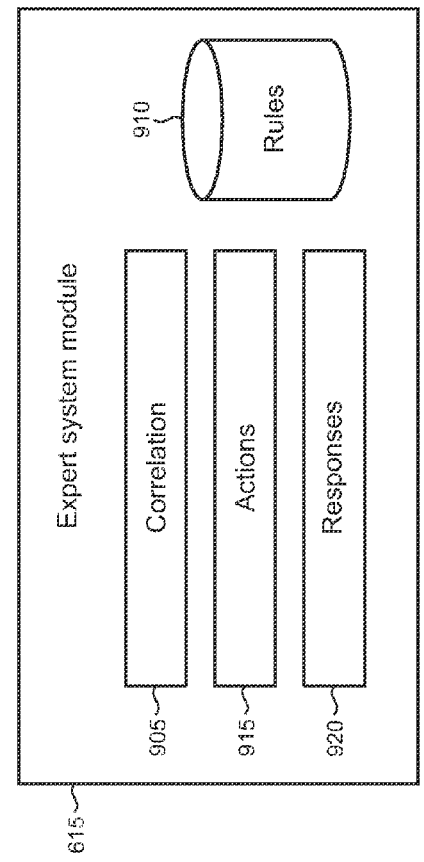
FIG. 9 shows illustrative details of the expert system module supported by the simulated participant system.

FIG. 9 shows illustrative details of the expert system module 615. The expert system module 615 correlates expressions obtained from the natural language processing module 605 with commands, questions, responses, and other utterances, as indicated by reference numeral 905. Using the results of the correlation, the expert system module 615 can then apply rules from a store 910 to generate appropriate simulated actions and responses (respectively indicated by reference numerals 915 and 920) that would be consistent with those actions of and responses of the live participant who is being simulated.

As noted above, the simulated participant system 105 operates to constantly train itself. Accordingly, the expert system module 615 will evaluate the accuracy of the virtual models it generates by predicting actions and/or responses of live participants using appropriate similarity algorithms and comparing the predicted actions/responses against the observed actual actions/responses to determine the success or failure of the prediction. If the difference exceeds an accuracy tolerance, then the applicable virtual models can be adjusted, for example, by collecting more observations of a live participant, increasing the number of stored responses, or by adjusting the mix of rules (or the rules themselves) applied by expert system module 615 when generating the simulated actions and responses.

Figure 10:
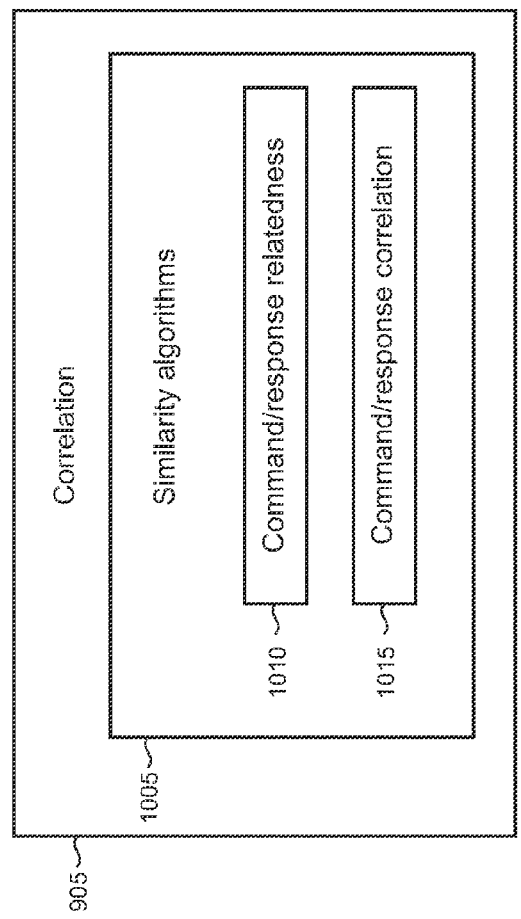
FIG. 10 shows an illustrative set of similarity algorithms supported by the simulated participant system.

As shown in FIG. 10, the correlation 905 utilized in the expert system module 615 uses a set of similarity algorithms 1005 that includes command/response relatedness 1010, and command/response correlation 1015. Relatedness and correlation are known: relatedness is based on a verbal response to a command given to a target (i.e., a subject of detected phrase) while Pearson's correlation coefficients may be used to create similarity weights for the resulting actions prompted by the command.

Figure 11:
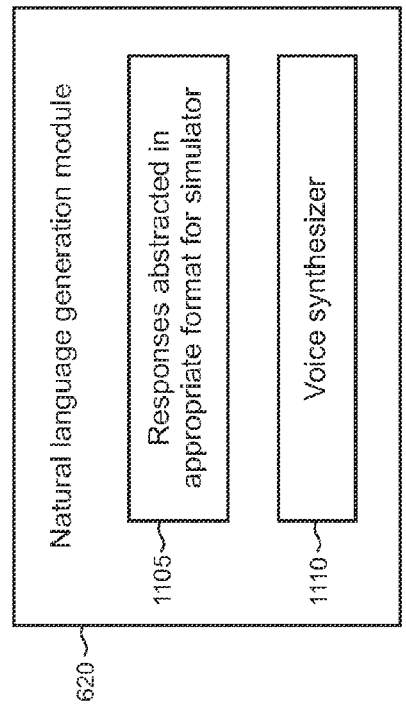
FIG. 11 shows illustrative details of a natural language generation module supported by the simulated participant system.

FIG. 11 shows illustrative details of the natural language generation module 620. The module 620 abstracts the responses generated by the expert system module 615 into an appropriate output format for a simulator 110 (as indicated by reference numeral 1105). Typically, for example, this process will result in the generation of an appropriate set of data packets in accordance with the particular protocol being utilized. However, in alternative implementations an analog signal may be generated and utilized. For example, the voice synthesizer 1110 may generate a signal for voice responses.

Figure 12:
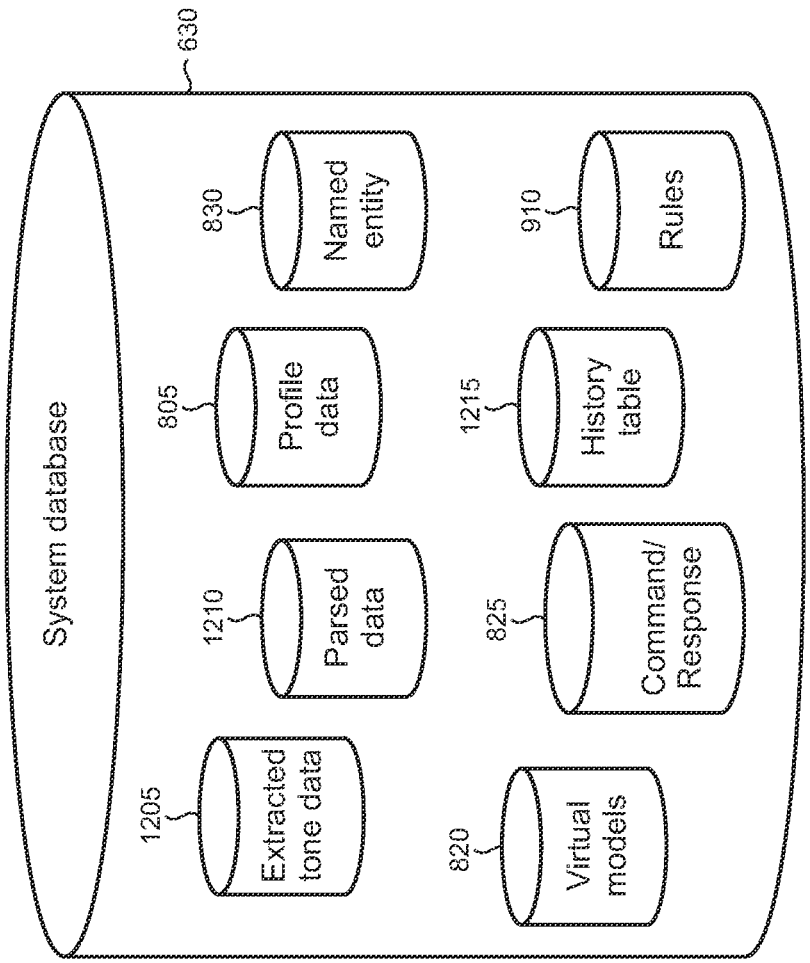
FIG. 12 shows illustrative details of a system database supported by the simulated participant system.

FIG. 12 shows illustrative details of the system database 630. As shown, the system database aggregates several of the stores that are described above including the profile data store 805, virtual model store 820, command/response store 825, named entity store 830, and rules store 910. The system database 630 is further configured with data stores for extracted tone data 1205 generated by the tone recorder 705 (FIG. 7) and parsed data 1210 generated by the natural language parser 715 (FIG. 7). In addition, a history table 1215 may be utilized to store detected utterances that the simulated participant system 105 does not use for some reason, for example, because such utterance is not deemed to be an appropriate or valid response. Data populated into the history table can be used for internal system maintenance, self-testing, evaluative purposes, and the like.

FIG. 13 is a flow chart 1300 of an illustrative method of operating the simulated participant system 105. The method starts at block 1305. At block 1310, voice and actions of live participants/instructors engaged in a simulation supported by a simulator 110 (FIG. 1) are monitored and used as inputs to the system via the interface with the simulator. Actions are abstracted and represented using action descriptions and annotations of features at block 1315. At block 1320, the detected voice is translated to a textual format such as XML.

The text is parsed to identify relevant parts-of-speech and named entities at block 1325, and targets and utterance types are identified at block 1330. At block 1335, communications among the live participants are tracked through application of the similarity algorithms. Simulated participant virtual models can then be built (and adjusted when necessary) as shown at block 1340.

Situational stimuli from the simulator 110 are received at block 1345 and are used as triggers to generate simulated responses at block 1350. As part of the simulated participant system's continuous training feature, the simulated response is compared against an actual response whenever a live participant engaging in a simulation may be observed, as shown at block 1355. At block 1360 the success or failure of prediction is determined and the applicable virtual model may be adjusted, at block 1365, in view of such success or failure. The simulated participant system 105 will output a simulated response to the simulator 110 in an appropriate format at block 1370. At block 1375 control is returned back to the start block 1305 so that the simulated participant system 105 operates in a closed-loop manner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for simulating behavior of a live participant in a simulation supported by a simulator, the method comprising the steps of:
   monitoring, by an expert system comprising a processor, the live participant for sound utterances as the live participant interacts with the simulation in a first session of the simulation;
   building, by the expert system, a virtual model of the live participant responsively to the monitoring;
   predicting a behavior of the live participant using the virtual model when triggered by a situational stimulus;
   comparing an observed actual behavior of the live participant in response to the situational stimulus with the predicted behavior;
   adjusting the virtual model responsively to a difference between the predicted behavior and actual behavior that results from the comparing;
   in a subsequent second session of the simulation, generating a simulated participant using the virtual model of the live participant; and
   providing an output representative of the simulated participant to the simulator as a stand-in for the live participant when the live participant is absent from the subsequent second session of the simulation.

2. The method of claim 1 in which the monitoring comprises monitoring conversations in which the live participant engages, and actions of the live participant.

3. The method of claim 2 including the further steps of extracting tone data from the conversations to determine one of urgency or priority and using the extracted tone data when building the virtual model.

4. The method of claim 1 in which the monitoring is performed substantially continuously.

5. The method of claim 1 in which the building is performed dynamically and comprises identifying patterns in monitored conversations and actions in which the live participant engages and applying similarity algorithms to the identified patterns.

6. The method of claim 5 in which the similarity algorithms comprise at least one of correlation similarity or relatedness similarity.

7. One or more computer-readable storage media containing instructions which, when executed by one or more processors disposed in a computing device, perform a method for providing an output representing a simulated participant, the method comprising the steps of
   creating a virtual model of a live participant in a first session of a simulation supported by a simulator by monitoring actions and voice responses of the live participant to situational stimuli that occur during the first session of the simulation;
   generating the simulated participant using the virtual model; and
   providing the simulated participant as a stand in for the live participant in a second subsequent session of the simulation when the live participant is absent from the second subsequent session of the simulation.

8. The one or more computer-readable storage media of claim 7 in which the method includes the further steps of creating virtual models for respective ones of a plurality of live participants in the first session of the simulation, generating a plurality of simulated participants using corresponding ones of the virtual models, and supplying the plurality of simulated participants as stand-ins for the plurality of live participants in the second session of the simulation when the plurality of live participants are absent from the second session of the simulation.

9. The one or more computer-readable storage media of claim 8 in which the supplying of the plurality of simulated participants is scaled up or scaled down responsively to requirements of the simulation.

10. The one or more computer-readable storage media of claim 8 in which some members of the plurality of simulated participants are of varying type.

11. The one or more computer-readable storage media of claim 7 in which the providing is performed over a communication path to the simulator using a protocol selected from one of HLA or DIS.

12. The one or more computer-readable storage media of claim 7 in which the virtual model is created dynamically by correlating target expressions in the voice responses against a profile.

13. The one or more computer-readable storage media of claim 12 in which the profile is created in conformance with a cognitive model.

14. A simulated participant system for generating simulated participants and configured for interoperability with a plurality of simulators, each of the simulators supporting simulations for one or more live participants, comprising:
   one or more interfaces over which one or more of data, function calls, methods, and arguments may be passed to respective one or more simulators in the plurality of simulators, the interfaces further being configured to receive as inputs data indicative of actions and conversations in which the live participants engage when interacting with the simulations supported by the simulators;
   a natural language processor arranged for processing the data to identify natural language expressions contained therein;
   an expert system arranged for dynamically building a unique virtual model for each of the live participants based on the received data, the virtual model being built by correlating the identified natural language expressions with utterances contained in the conversations, the expert system further being configured for generating a voice response for the simulated participant using the virtual model, and providing the simulated participant as a stand-in for a respective live participant when the respective live participant is absent from the simulation; and
   a natural language generator for generating an output representative of the voice response, the output being usable for implementing the simulated participants on the simulators.

15. The simulated participant system of claim 14 in which the natural language processor employs a parser to deconstruct phrases into parts of speech and named entities.

16. The simulated participant system of claim 14 further including a profiler for maintaining profiles of the live participants and the simulated participants.

17. The simulated participant system of claim 14 in which the expert system is further configured to build virtual models on a cross-platform basis so that an output representative of simulated participants of varying types are supplied to a selected simulator.

18. The simulated participant system of claim 14 in which the natural language processor includes a parser comprising one of a Stanford parser or a Charniak parser.

* * * * *